2,900,390

MANUFACTURE OF COPPER PHTHALOCYANINE

Robert E. Brouillard, Westfield, N.J., and Thomas R. Tarantino, Staten Island, N.Y., assignors to General Aniline & Film Corporation, New York, N.Y., a corporation of Delaware No Drawing. Application July 26, 1956
Serial No. 600,154

12 Claims. (Cl. 260—314.5)

This invention relates to the manufacture of copper phthalocyanine and relates more particularly to a novel process for the preparation of copper phthalocyanine of high purity.

Phthalocyanine pigments, and particularly, copper phthalocyanine, are relatively new but very important articles of commerce. Since their introduction, they have achieved great commercial significance in the manufacture of paints, enamels, lacquers, plastics, rubber and in all other fields of application where products of maximum brilliance of shade and exceptional fastness properties are desired.

One of the most important processes for the preparation of copper phthalocyanine was described by Max Wyler in U.S. Patent No. 2,197,458. In accordance with the process of this patent, phthalic anhydride, phthalimide or equivalent material is heated with a copper salt, such as cupric chloride, and a sufficient quantity of urea to produce a melt, recovery of the copper phthalocyanine so formed being effected by pulverizing the cooled solid reaction mass and extracting with dilute aqueous alkali and then with dilute aqueous acid. To render the product suitable for commercial application further processing thereof was usually required, involving solution of the product in concentrated sulfuric acid and precipitation by drowning in water under carefully regulated conditions.

The above Wyler process has been improved in a number of ways. Thus, one of the improvements in said process consisted in the addition of molybdates, as catalysts. These catalysts greatly improved the yield and gave a product less contaminated with by-products. Another improvement involved the use of a solvent such as trichlorobenzene as the reaction medium, which moderated the exotherm and further improved the yield. It was also found that where a low boiling solvent, such as monochlorobenzene, was employed in a mixture of solvents the sublimate from the reaction mixture does not produce major operating difficulties.

Isolation and purification of copper phthalocyanine from the reaction mixture of the solvent process has been effected in one of two ways. In the first of these, the mixture is filtered and the filter cake dry distilled. The dried cake is then extracted with an aqueous alkali followed by extraction with aqueous acid and dried again. It is then ready for the acid pasting operations. The second method of isolating the product involves filtration and steam distillation under conditions which will remove the reaction by-products. The aqueous slurry which results is then filtered and the product dried and acid pasted.

The prime function of the above described extraction procedures is the elimination of inorganic salt and very appreciable amounts of the various decomposition products of urea, such as biuret, cyanuric acid, ammilide, etc. A modification in the conventional extraction procedure, whereby the liquid reaction mass is not filtered but is treated with an aqueous solution of an alkali metal hydroxide, has been proposed. The treatment is effected by agitating the liquid phases jointly at elevated temperatures, say between 50–105° C. Then, after allowing the mass to separate into layers, the aqueous alkaline layer is decanted and the mass is agitated with hot water at least once to extract as much alkali as conveniently possible from the organic layer. The aqueous layer is decanted after each treatment and the washed organic layer is subjected to steam distillation. The pigment in the aqueous phase is then isolated by filtration.

It is an important object of our invention to provide an improved process for removing the impurities and decomposition products obtained in preparing copper phthalocyanine by the solvent process.

Other objects of our invention will appear from the following detailed description and claims.

In accordance with our invention, a reaction mass containing copper phthalocyanine, made by heating together at a temperature of about 200° C. phthalic anhydride, cuprous chloride, urea and ammonium molybdate in trichlorobenzene, is cooled to 140° C. after the reaction is complete and is introduced at a slow and measured rate into an agitator, such as a hammermill, with water. It is essential that the ratio of water to reaction mass containing the copper phthalocyanine must be greater than 4:1. We have found that if the ratio is lower, incomplete extraction of the impurities results and the product will require additional extraction. Moreover, the temperature of the reaction mass and of the water is also critical. Thus, it is important that the temperature of the reaction mass be at least 120° C. and preferably 140 to 150° C. Reaction masses of higher temperatures may be employed but they have no particular advantage. The temperature of the water should be about 50° C. or higher. However, it is preferable to maintain the water temperature below 85° C. in order to minimize the violence of the interaction between the reaction mass and water in the hammermill.

It is probable that the unexpected efficiency of the process of the instant invention is due to explosive contact of heated water with the organic phase whose temperature is considerably above the boiling point of water. This we believe causes a violent physical reaction in which the water is propelled into the innermost portions of the organic phase and thereby effects substantially complete extraction. If the temperature conditions specified are made more drastic, much of the water used is converted to steam and the beneficial effects are not as great. This invention is obviously not limited by this theory of operation.

The mixture of copper phthalocyanine suspended in organic solvent and aqueous layer containing the impurities may be treated in one of several ways after contact in the hammermill. It is possible to separate the aqueous layer by decantation and isolate the product from the organic layer by filtration and solvent removal. Alternately, the whole mass may be filtered directly and the solvent recovered from the aqueous layer after the removal of the product. There are several major advantages in this latter process. One of these is that the extraction is so thorough in one pass through the system that the filter cake obtained may be steam stripped without troublesome foaming or it may be dry distilled with no difficulty. The product then is pre-eminently suitable for acid pasting and for conversion to commercial brands of maximum brilliance and purity. It is also suitable for halogenation to highly chlorinated pigments such as hexadecachloro copper phthalocyanine.

In addition to producing copper phthalocyanine of great purity, other unforeseen and very important advantages of the process are:

(1) The solvent recovered from the aqueously suspended or dissolved impurities is in such a state of purity that it can be used without rectification in the manufacture of copper phthalocyanine by the above described Wyler process.

(2) The use of corrosive acid and alkaline systems are avoided. This makes it possible to fabricate the processing equipment more economically.

(3) Repeated extractions are avoided thus reducing processing time and expense.

The following example is given to illustrate further our invention, the parts being by weight unless otherwise noted:

Example

A mixture of 373 parts of phthalic anhydride, 70 parts of cupric chloride, 600 parts of urea, 2 parts of ammonium molybdate and 1500 parts of trichlorobenzene is heated to 200° C. under reflux until the reaction is complete. The reaction mass is then cooled to 140° C. The reaction mass is then fed into a hammermill together with water at a temperature of 50° C., the ratio of feed being 4 parts of water to one part of reaction mixture by volume.

The mixture of reaction mass and water is then passed through a filter press. The filter cake is then steam stripped and the trichlorobenzene is recovered from the aqueous layer of the filtrate.

It is to be understood that the foregoing detailed description is given merely by way of illustration and that many variations may be made therein without departing from the spirit of our invention.

Having described our invention, what we desire to secure by Letters Patent is:

1. In a process for preparing copper phthalocyanine by reacting together at a temperature of about 200° C. phthalic anhydride, a copper salt and urea in the presence of a catalyst and a solvent, the improvement which comprises recovering the copper phthalocyanine by the steps of reducing the temperature of the reaction mass but not below 120° C., then forming a mixture of the cooled reaction mass with water at a temperature of at least 50° C. by pulverizing the reaction mass and water together, the volume of water used in said mixture being greater than four times the volume of the reaction mass, and agitating said mixture.

2. Process according to claim 1 wherein the temperature of the water employed in forming the mixture is from about 50° C. to about 85° C.

3. Process according to claim 1 wherein the reaction mass is cooled to a temperature of about 140 to 150° C.

4. Process according to claim 1 wherein the temperature of the water employed in forming the mixture is from about 50° C. to about 85° C. and the reaction mass is cooled to a temperature of about 140–150° C.

5. In a process of preparing copper phthalocyanine by reacting together at a temperature of about 200° C. phthalic anhydride, a copper salt and urea in the presence of a catalyst and a solvent, the improvement which comprises recovering the copper phthalocyanine by the steps of reducing the temperature of the reaction mass but not below 120° C., then forming a mixture of the cooled reaction mass with water at a temperature of at least 50° C. by pulverizing the reaction mass and water together, the volume of water used in said mixture being greater than four times the volume of the reaction mass, agitating said mixture, filtering said reaction mass/water mixture, and recovering the solvent from the aqueous layer of the filtrate.

6. Process according to claim 5 wherein the temperature of the water employed in forming the mixture is from about 50° C. to about 85° C.

7. Process according to claim 5 wherein the reaction mass is cooled to a temperature of about 140 to 150° C.

8. Process according to claim 5 wherin the temperature of the water employed in forming the mixture is from about 50° C. to about 85° C. and the reaction mass is cooled to a temperature of about 140–150° C.

9. In a process of preparing copper phthalocyanine by reacting together at a temperature of about 200° C. phthalic anhydride, a copper salt and urea in the presence of a catalyst and a solvent, the improvement which comprises recovering the copper phthalocyanine by the steps of reducing the temperature of the reaction mass but not below 120° C., then forming a mixture of the cooled reaction mass with water at a temperature of at least 50° C. by pulverizing the reaction mass and water together, the volume of water used in said mixture being greater than four times the volume of the reaction mass, agitating said mixture, filtering said reaction mass/water mixture, steam stripping the filter cake formed and recovering the solvent from the aqueous layer of the filtrate.

10. Process according to claim 9 wherein the reaction mass is cooled to a temperature of about 140 to 150° C.

11. Process according to claim 9 wherein the temperature of the water employed in forming the mixture is from about 50° C. to about 85° C.

12. Process according to claim 9 wherein the temperature of the water employed in forming the mixture is from about 50° C. to about 85° C. and the reaction mass is cooled to a temperature of about 140–150° C.

References Cited in the file of this patent

UNITED STATES PATENTS

| | | |
|---|---|---|
| 2,213,726 | Wyler | Sept. 3, 1940 |
| 2,382,441 | Reynolds et al. | Aug. 14, 1945 |
| 2,668,171 | Compton | Feb. 2, 1954 |
| 2,723,980 | Tarantino et al. | Nov. 15, 1955 |

FOREIGN PATENTS

| | | |
|---|---|---|
| 156,571 | Austria | July 25, 1939 |
| 658,019 | Germany | Mar. 19, 1938 |
| 745,772 | Great Britain | Feb. 29, 1956 |